US008423235B2

(12) United States Patent
Lee

(10) Patent No.: US 8,423,235 B2
(45) Date of Patent: Apr. 16, 2013

(54) VIDEO RECORDING DEVICE FOR VEHICLE AND DRIVING INFORMATION PROVIDING METHOD THEREOF

(75) Inventor: Kam-Youn Lee, Gwangmyeong-si (KR)

(73) Assignee: Mtekvision Co., Ltd., Seoul (KR)

( * ) Notice: Subject to any disclaimer, the term of this patent is extended or adjusted under 35 U.S.C. 154(b) by 168 days.

(21) Appl. No.: 12/880,708

(22) Filed: Sep. 13, 2010

(65) Prior Publication Data

US 2011/0066317 A1 Mar. 17, 2011

(30) Foreign Application Priority Data

Sep. 14, 2009 (KR) ........................ 10-2009-0086387

(51) Int. Cl.
*G06F 19/00* (2011.01)
*H04N 7/167* (2011.01)

(52) U.S. Cl.
USPC .......................... 701/31.4; 701/32.2; 380/200

(58) Field of Classification Search ................. 701/31.4; 340/937
See application file for complete search history.

(56) References Cited

U.S. PATENT DOCUMENTS 6,141,611 A * 10/2000 Mackey et al. .............. 701/32.2
6,718,239 B2 * 4/2004 Rayner ........................ 701/32.6
2004/0049324 A1 * 3/2004 Walker .............................. 701/1
2006/0287783 A1 * 12/2006 Walker ............................ 701/29
2007/0009104 A1 * 1/2007 Renkis .......................... 380/270
2008/0122288 A1 * 5/2008 Plante et al. ................. 307/10.1
2010/0194887 A1 * 8/2010 Ono et al. ..................... 348/148
2012/0173905 A1 * 7/2012 Diab et al. .................... 713/320

FOREIGN PATENT DOCUMENTS

KR 10-1999-0049951 A 7/1999
KR 10-2004-0073816 A 8/2004
KR 10-0917442 B1 9/2009

* cited by examiner

*Primary Examiner* — Thomas Tarcza
*Assistant Examiner* — Tyler J Lee
(74) *Attorney, Agent, or Firm* — Birch, Stewart, Kolasch & Birch, LLP

(57) ABSTRACT

A vehicle video recording device and a driving information providing method are provided. The vehicle video recording device includes: a sensing unit that includes one or more of a positioning unit, an inertia sensor unit, and an environment sensor unit so as to output sensed information; a vehicle information collecting unit that collects vehicle information from one or more of one or more sensors and a self-diagnosis device disposed in a vehicle; and a driving information generating unit that generates driving information depending on use or nonuse of the vehicle on the basis of one or more of the sensed information and the vehicle information. Accordingly, it is possible to continuously manage information on a driving time of a vehicle or the accident possibility in driving a vehicle, thereby giving an advantage or a disadvantage to a driver.

17 Claims, 5 Drawing Sheets

VIDEO RECORDING DEVICE FOR VEHICLE AND DRIVING INFORMATION PROVIDING METHOD THEREOF

CROSS REFERENCE

This application is based on and claims priority under 35 USC 119 from Korean Patent Application No. 10-2009-0086387, filed on Sep. 14, 2009.

BACKGROUND

1. Technical Field

The present invention relates to a vehicle video recording device, and more particularly, to a vehicle video recording device and a driving information providing method.

2. Background Art

As vehicles increasingly become necessities, side effects such as illegal parking problems, traffic jams, and traffic accidents also increase.

Particularly, the traffic accidents might be smoothly settled by the agreement between the interested persons, but when the degrees of negligence are vague, the agreement between the interested persons is not easily reached. In case of a hit-and-run accident, very severe aftereffects may be caused from the moral point of view.

Therefore, the traffic accidents need to be treated on the basis of objective materials. Various methods for mounting a device like a black box of an airplane on a vehicle and utilizing the record of the device as objective materials at the time of treating a traffic accident have been developed in consideration of the above-mentioned necessity.

Vehicle black box systems (vehicle video recording devices) which are being developed mainly employ a method of recording and storing video data obtained by capturing an image of the periphery of the vehicle with a camera. Such vehicle video recording devices can be classified into a type not including a liquid crystal display because it can be connected to an external electronic apparatus so as to confirm recorded video data and a type including a liquid crystal display so as to confirm the recorded video data by itself.

The configuration of a known vehicle video recording device will be described in brief with reference to FIG. 1.

Referring to FIG. 1, a video recording device 110 includes a program storage unit 120, a video input unit 125, an encoding/decoding unit 130, a video storage unit 135, a display unit 140, an information providing unit 145, an information storage unit 150, and a control unit 155.

A program for driving the video recording device 110 is stored in the program storage unit 120. For example, software for driving one or more of the control unit 155, the encoding/decoding unit 130, and the like is stored in the program storage unit 120.

The video input unit 125 generates and outputs a video signal corresponding to an input outside video. The video input unit 125 includes one or more of, for example, a lens, an image sensor, and an image signal processor (ISP). The video input unit 125 may be a monitoring camera monitoring one or more of front, rear, left, and right sides.

The encoding/decoding unit 130, stores video data, which is obtained by encoding the video signal input from the video input unit 125, in the video storage unit 135 or decodes the video data stored in the video storage unit 135 and displays the decoded video data by the use of the display unit 140.

The video storage unit 135 serves to store the video data generated by the encoding/decoding unit 130.

The display unit 140 outputs one or more of the operation state of the video recording device 110 and the video data decoded by the encoding/decoding unit 130 as visual information.

The information providing unit 145 serves to provide information on GPS-received information (for example, positional coordinates) and/or a vehicle engine.

The information storage unit 150 serves to store the information provided from the information providing unit 145.

The control unit 155 controls the constituent elements of the video recording device 110 to perform the above-mentioned functions. The control unit 155 may process the information input from the information providing unit 145 for the storage in the information storage unit 150.

As described above with reference to FIG. 1, the known vehicle video recording device can record videos before and after an accident occurs and thus provide an objective material for determining the locus of responsibility of the accident.

However, the known vehicle video recording device has a usage or purpose of only storage of an accident-related video, but does not provide any material for determining the accident possibility in advance.

Generally, when the use of a vehicle (for example, a traveling distance or a driving time) increases or a driver does not tend to defensively drive the vehicle (for example, overspeed, sudden acceleration, and sudden operation of a steering wheel), the possibility of accident increases. However, these factors are not reflected in determining a preliminary loss ratio or a premium of an automobile insurance, thereby not guiding a driver to a preferable driving habit.

SUMMARY

An advantage of some aspects of the invention is that it provides a vehicle video recording device and a driving information providing method, which can continuously manage information on a driving time of a vehicle or the accident possibility in driving a vehicle, thereby giving an advantage or a disadvantage to a driver.

Another advantage of some aspects of the invention is that it provides a vehicle video recording device and a driving information providing method, which can effectively control driving information of a vehicle and minimize a user's unpleasant feeling in collecting information.

Another advantage of some aspects of the invention is that it provides a vehicle video recording device and a driving information providing method, which can transmit driving information, which is information on use of a vehicle, to a control center without additional cost (for example, utilization fee of a communication network).

Another advantage of some aspects of the invention is that it provides a vehicle video recording device and a driving information providing method, which can easily verify that driving information is normally generated and stored with the use of a vehicle, thereby guaranteeing the reliability of data.

Another advantage of some aspects of the invention is that it provides a vehicle video recording device and a driving information providing method, which can enforce the transmission of driving information by encrypting and storing a recorded video and transmitting decryption key information for decrypting the encrypted video before the transmission of the driving information.

Other advantages of the invention will be easily understood from the following description.

According to an aspect of the invention, there is provided a vehicle video recording device for recording an outside video and generating driving information depending on use and nonuse of a vehicle.

The vehicle video recording device includes: a sensing unit that includes one or more of a positioning unit, an inertia sensor unit, and an environment sensor unit so as to output sensed information; a vehicle information collecting unit that collects vehicle information from one or more of one or more sensors and a self-diagnosis device disposed in a vehicle; and a driving information generating unit that generates driving information depending on use or nonuse of the vehicle on the basis of one or more of the sensed information and the vehicle information.

The driving information may be transmitted to a control center via a network.

The vehicle video recording device may further include a data processor that generates an encrypted data file corresponding to the outside video, and decryption key information for decrypting the encrypted data file may be supplied from the control center after the driving information is transmitted.

The vehicle video recording device may further include: an auxiliary power supply unit that supplies driving power when the driving power is not supplied from the vehicle; and a control unit that determines whether the device is in a deactivated state at a predetermined time, switches the device to an activated state using the auxiliary power supply unit so as to generate the driving information when the device is in a deactivated state, and switches the device to the deactivated state after the driving information is generated.

The driving information generating unit may further generate one or more of verification information for verifying the driving information and verification result information.

The driving information may be verified by determining whether position information included in the driving information generated after the device is switched to the activated state is matched with position information included in the driving information generated and stored just before.

The driving information may be verified by determining whether video data generated when the device is switched to the activated state is matched with video data stored just before within a margin of error.

A battery voltage of the vehicle may be measured in real time, and when the battery voltage varies by a threshold voltage or more within a designated time range, position information and time information at that time may be stored as the verification information.

According to another aspect of the invention, there is provided a driving information generation method carried out in a vehicle video recording device recording an outside video and/or a recording medium having recorded thereon a program for carrying out the driving information generating method.

The driving information generating method includes the steps of: acquiring vehicle information and sensed information using a self-diagnosis device and one or more sensors; and generating driving information depending on use or nonuse of a vehicle on the basis of one or more of the sensed information and the vehicle information.

The driving information may be transmitted to a control center via a network.

The driving information generating method may further include the steps of: generating an encrypted data file corresponding to the outside video; and receiving decryption key information for decrypting the encrypted data file after the driving information is transmitted.

The driving information generating method may further include the steps of: determining whether the device is in a deactivated state at a predetermined time and switching the device to an activated state using an auxiliary power supply unit when it is determined that the device in the deactivated state; generating the driving information; and switching the device to the deactivated state.

The driving information generating method may further include a step of further generating one or more of verification information for verifying the driving information and verification result information.

The driving information may be verified by determining whether position information included in the driving information generated after the device is switched to the activated state is matched with position information included in the driving information generated and stored just before.

The driving information may be verified by determining whether video data generated when the device is switched to the activated state is matched with video data stored just before within a margin of error.

A battery voltage of the vehicle may be measured in real time, and when the battery voltage varies by a threshold voltage or more within a designated time range, position information and time information at that time may be stored as the verification information.

According to the above-mentioned configuration, it is possible to continuously manage information on a driving time of a vehicle or the accident possibility in driving a vehicle, thereby giving an advantage or a disadvantage to a driver.

According to the above-mentioned configuration, it is possible to effectively control driving information of a vehicle and minimize a user's unpleasant feeling in collecting information.

According to the above-mentioned configuration, it is possible to transmit driving information, which is information on use of a vehicle, to a control center without additional cost (for example, utilization fee of a communication network).

According to the above-mentioned configuration, it is possible to easily verify that driving information is normally generated and stored with the use of a vehicle, thereby guaranteeing the reliability of data.

According to the above-mentioned configuration, it is possible to enforce the transmission of driving information by encrypting and storing a recorded video and transmitting decryption key information for decrypting the encrypted video before the transmission of the driving information.

DESCRIPTION OF EXEMPLARY EMBODIMENTS

Figure 1:
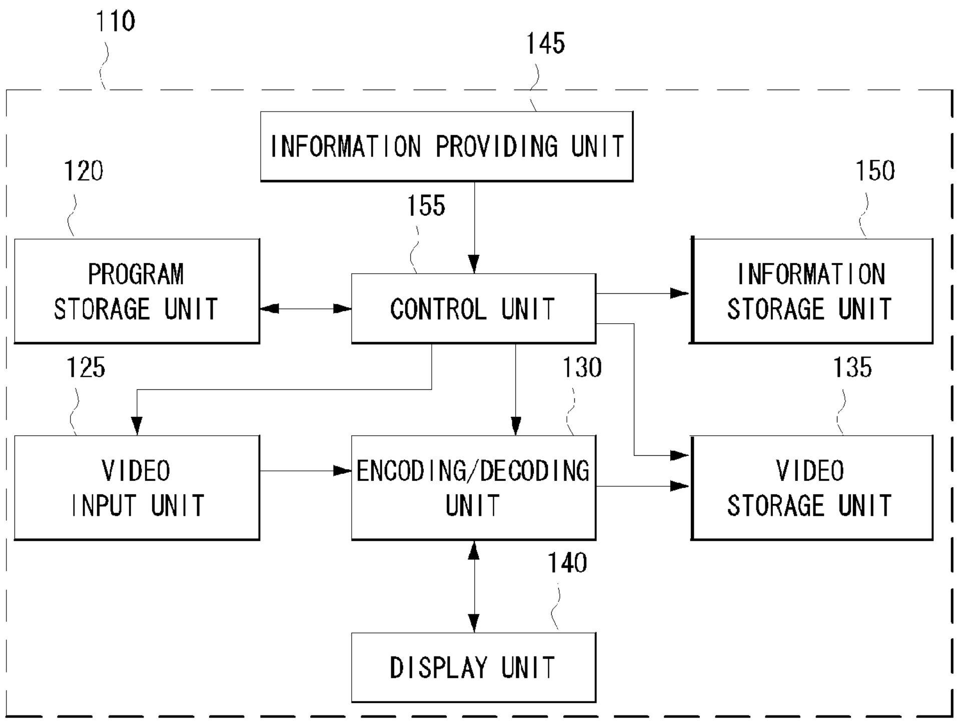
FIG. 1 (PRIOR ART)
FIG. 1 is a diagram schematically illustrating the configuration of a vehicle video recording device according to a background art.

The invention can be variously modified in various forms and specific embodiments will be described and shown in the drawings. However, the embodiments are not intended to limit the invention, but it should be understood that the invention includes all the modifications, equivalents, and replacements belonging to the spirit and the technical scope of the invention. When it is determined that detailed description of known techniques associated with the invention makes the gist of the invention obscure, the detailed description will be omitted.

Terms such as "first" and "second" can be used to describe various elements, but the elements are not limited to the terms. The terms are used only to distinguish one element from another element.

The terms used in the following description are used to merely describe specific embodiments, but are not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Terms, "unit", "-er (-or)", "module", and the like, described in the specification mean a unit for performing at least one function or operation and can be embodied by hardware, by software, or by a combination of hardware and software.

The exemplary embodiments of the invention will be described now in detail with reference to the accompanying drawings.

Figure 2:
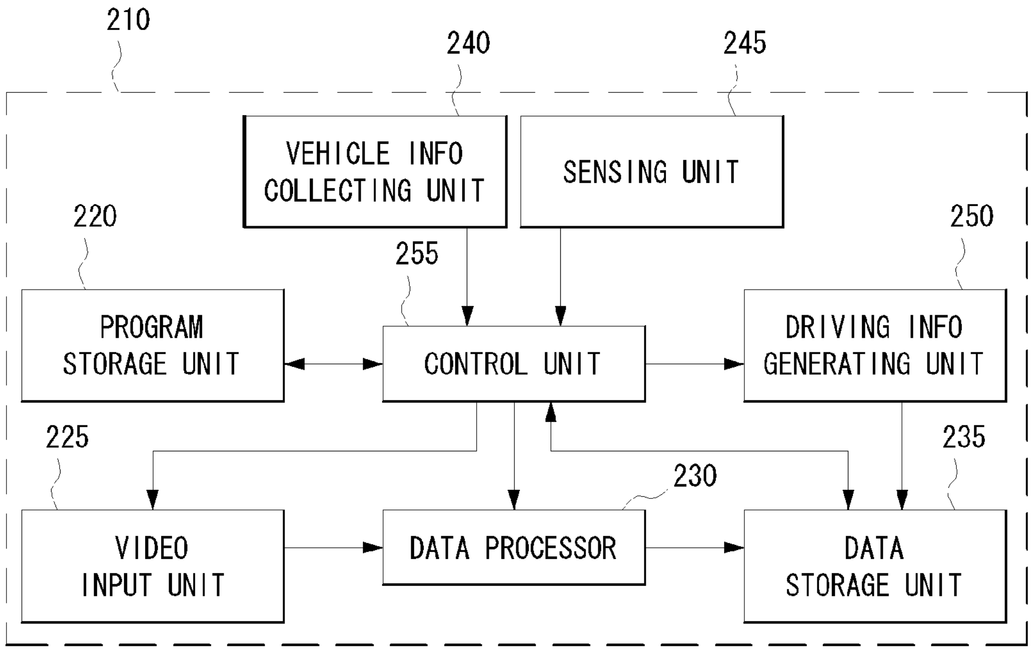
FIG. 2 is a diagram schematically illustrating the configuration of a vehicle video recording device according to an exemplary embodiment of the invention.

FIG. 2 is a diagram schematically illustrating the configuration of a vehicle video recording device according to an exemplary embodiment of the invention.

Referring to FIG. 2, a vehicle video recording device 210 includes a program storage unit 220, a video input unit 225, a data processor 230, a data storage unit 235, a vehicle information collecting unit 240, a sensing unit 245, a driving information generating unit 250, and a control unit 255.

Although not shown in the drawing, the vehicle video recording device 210 further includes one or more elements of an audio input unit, a key input unit, a power supply unit, a display unit, and wired/wireless transmission unit. One or more elements (for example, the driving information generating unit 250) can be embodied by a software program. Two or more elements shown in FIG. 2 may be combined in a single element or one element may be embodied in two or more elements.

A program for driving the vehicle video recording device 210 is stored in the program storage unit 220. For example, a software program serving as one or more of the control unit 225, the data processor 230, and the driving information generating unit 255 can be stored in the program storage unit 220 for use.

The video input unit 225 generates a video signal corresponding to an input outside video and outputs the generated video signal. The video signal output from the video input unit 225 has a predetermined signal format for a compressing and/or encrypting process in the data processor 230.

The video input unit 225 includes one or more of, for example, a lens, an image sensor, and an image signal processor (ISP). The video input unit 225 may include, for example, two or more lenses and two or more image sensors to generate and output multi-channel video signals to the data processor 230. That is, the video input unit 225 may include a monitoring camera monitoring one or more of a vehicle outside (that is, one or more of front, rear, left, and right) and/or a vehicle inside.

The data processor 230 may process the video signal input from the video input unit 225 and store the processed video signal in the data storage unit 235, or may store the video signal in a temporary storage unit (not shown) and then store the video signal in the data storage unit 235. The data processor 230 performs one or more of, for example, a video signal encoding process, a decoding process, an encryption process, and a decryption process. The data processor 230 may be, for example, a multimedia processor.

When the vehicle video recording device 210 further includes an audio input unit, the data processor 230 encodes the video signal input from the video input unit 225 and/or the audio signal input from the audio input unit to generate a data file. The data file may be independently by encoding the video signal and the audio signal individually, or may be generated in a single data file. The video signal may be processed, for example, by a still image compressing method such as JPEG and/or a video compressing method (for example, one or more of MPEG4, H.263, H.264, WMV, DIVX, and XVID), and the audio signal may be processed by an audio compressing method (for example, one or more of AAC, MP3, MP2, WMA, OGG, G.729, 713, and AMR). The data file in which the video signal and the audio signal are combined may be generated with a file format of MPEG4 or the like.

The data processor 230 may insert acquired information (that is, vehicle information provided from the vehicle information collecting unit 240 and/or sensed information provided from the sensing unit 245) provided from the vehicle information collecting unit 240 and/or the sensing unit 245 into a user data area of the data file in which the video signal and the audio signal are combined.

The data storage unit 235 stores the data file obtained by encoding and/or encrypting the video signal and/or the audio signal and the driving information generated by the driving information generating unit 255. The data storage unit 235 may store the vehicle information collected by the vehicle information collecting unit 240 and the sensed information sensed by the sensing unit 245, or may store information generated using the information. The data storage unit 235 may further store decryption key information received from a control center (not shown) so as to decrypt the encrypted data file. The data storage unit 235 may include a memory device built in the vehicle video recording device 210 or/and a detachable nonvolatile memory card.

The vehicle information collecting unit 240 collects the vehicle information (for example, one or more of vehicle engine information, engine revolution number, and coolant temperature) from a self-diagnosis device (such as an OBD (On Board Diagnostics) and a KOBD (Korea On Board Diagnostics)) mounted on the vehicle. The vehicle information collecting unit 240 may be connected to the self-diagnosis device to be supplied with the corresponding information or may receive the corresponding information from the self-diagnosis device by a Wireless Personal Area Network system.

When the self-diagnosis device is coupled to sensors for sensing additional vehicle information on one or more of a brake signal, a safety belt signal, a direction indicator signal, and an inter-vehicle distance, the vehicle information collecting unit 240 may further collect the additional vehicle information from the self-diagnosis device. When the sensors providing the additional vehicle information are connected to the vehicle information collecting unit 240, the vehicle information collecting unit 240 may directly collect the additional vehicle information from the sensors.

The sensing unit 245 may include one or more of a positioning unit outputting position information of a vehicle, an inertia sensor unit sensing a motion of the vehicle, and an environment sensor unit sensing whether the vehicle video recording device 210 is located inside the vehicle.

The positioning unit may include a GPS receiver, and receives satellite data and outputs one or more of latitude, longitude, altitude, and time of the current position. The driving information generating unit 250 and/or the control unit 255 can calculate the moving speed and the bearing angle using information on a change in position, calculate the traveling distance of the vehicle, record the traveling path, or store the position of a traffic accident.

The inertial sensor unit includes an inertia sensor (such as an acceleration sensor and an angular velocity sensor) and is used to acquire information on the vehicle movement and to accurately calculate the traveling distance in a GPS-disabled area. The driving information generating unit 250 and/or the control unit 255 can use the information to determine whether the vehicle is subjected to a traffic accident, or can use the information as data for determining the situations before and after the traffic accident The control unit 255 can determine, for example, when the output value of the inertia sensor unit is greater than a threshold value predetermined for determining the occurrence of a traffic accident or a variation of the output value for a predetermined time is greater than a predetermined value.

The environment sensor unit includes one or more sensors sensing the installation environment, such as a temperature sensor for measuring the temperature, a humidity sensor for measuring the humidity, and an illuminometer for sensing the brightness.

The driving information generating unit 250 generates the driving information of a vehicle on the basis of the acquired information (that is, the vehicle information acquired by the vehicle information collecting unit 240 and/or the sensed information acquired by the sensing unit 245) provided from the vehicle information collecting unit 240 and/or the sensing unit 245. The format of the driving information or the information used to generate the driving information may be various.

The information on the traveling distance, the traveling speed, and the wearing of a safety belt can be verified on the basis of the generated driving information. Such information can be used as materials for giving an advantage (such as a discount of premium and an advantage based on a weekday no-driving system) or a disadvantage to the corresponding driver.

The driving information generating unit 250 may perform an operation for verifying that the vehicle video recording device 210 is normally installed in a vehicle or that the driving information is normally generated while the driver is driving a vehicle.

The operation of the driving information generating unit 250 will be described in detail later with reference to the drawings.

The control unit 255 controls the constituent elements of the vehicle video recording device 210 to perform the above-mentioned functions. The control unit 255 may be embodied as a control unit which is physically or/and conceptually combined with the data processor 230 or/and the driving information generating unit 250.

The control unit 255 can determine whether a traffic accident occurs on the basis of the acquired information input from the vehicle information collecting unit 240 and/or the sensing unit 245, and can perform a control of one or more of the storage of the acquired information in the data storage unit 235, the insertion of the acquired information into the data file, and the deletion of data from the data storage unit 235 so as to guarantee a storage space.

Figure 3:
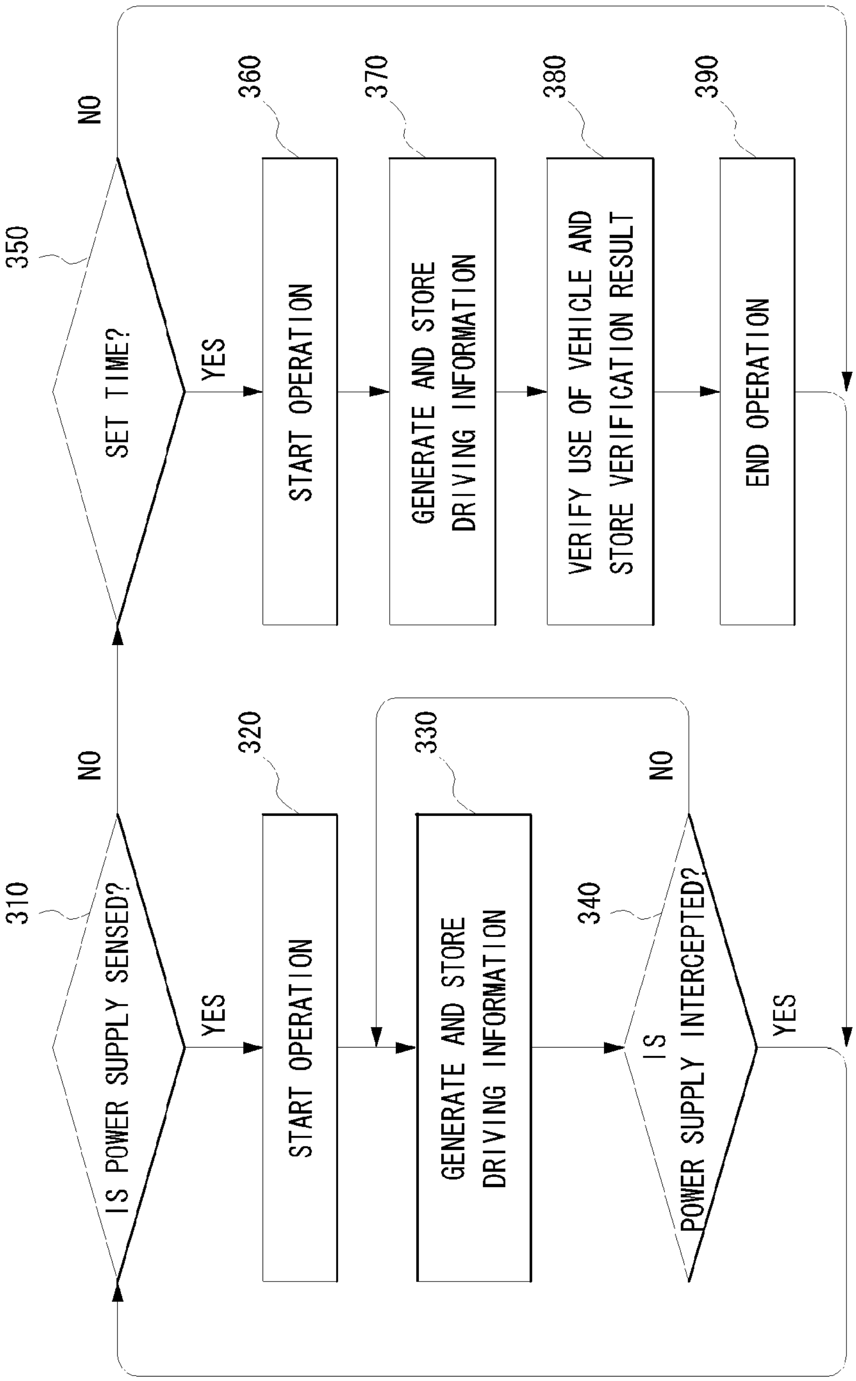
FIG. 3 is a flow diagram illustrating a driving information generating procedure according to an exemplary embodiment of the invention.

FIG. 3 is a flow diagram illustrating a driving information generating procedure according to an exemplary embodiment of the invention.

Referring to FIG. 3, the vehicle video recording device 210 determines whether the supply of power from the vehicle is sensed in step 310. The vehicle video recording device 210 may be constructed so that power is supplied directly from a battery of the vehicle by starting up the vehicle, or may be constructed so that a power input terminal is connected to a power supply terminal (for example, a cigar jack) of the vehicle and thus power is supplied from the vehicle. As described later, the vehicle video recording device 210 may further include an auxiliary power supply unit so as to generate the driving information and/or to store an accident video even when power is not supplied from the vehicle.

When the supply of power from the vehicle is sensed, the vehicle video recording device 210 is activated in step 320 and generates and stores the driving information in a predetermined way in step 330.

The driving information is information on whether the vehicle is traveling or is parked and can be used as materials for giving an advantage or disadvantage to the driver as described above. For example, when the driving information is provided to a control center and is shared by various insurance companies, the driving information can be used as materials for differentially calculating premiums. The driving information can be transmitted to the control center, for example, at the time that the device accesses the control center to receive the decryption key information for reproducing the encrypted and stored video information, the time that the driver inputs a driving information transmitting command, the time that a program installed in the vehicle video recording device 210 is updated.

The driving information is generated by the driving information generating unit 250. At this time, the acquired information (that is, vehicle information provided from the vehicle information collecting unit 240 and/or sensed information provided from the sensing unit 245) provided from the vehicle information collecting unit 240 and/or the sensing unit 245 can be used.

The driving information includes one or more of, for example, a driving date, a traveling distance, a traveling speed, a direction indicator signal, a safety belt wearing signal, an acceleration pedal signal, a brake signal, a residual fuel signal, and an ejected fuel signal. The driving information may include verification information to be described later.

In step 340, the vehicle video recording device 210 determines whether the supply of power is stopped. The supply of power to the vehicle video recording device 210 from the vehicle is stopped when the vehicle is started up or/and the power input terminal is disconnected from the power supply terminal (for example, a cigar jack) of the vehicle. In this case, the vehicle video recording device 210 may be driven with the supply of power from a charged power source of the auxiliary power supply unit, but when the supply of power from the vehicle is stopped by the turning-off of the vehicle, it is assumed that the vehicle video recording device 210 is deactivated.

When the supply of power from the vehicle is maintained, the process of step 330 is performed again. However, when the supply of power from the vehicle is stopped, the process of step 310 is performed again.

Although it has been described mainly that the driving information is generated and stored in steps 310 to 330, it is obvious that the vehicle video recording device 210 may record and store a video of the periphery of the vehicle so as to maintain an accident video. The vehicle video recording device 210 may encode and encrypt the stored video signals.

When it is determined in step 310 that power is not supplied from the vehicle or the vehicle video recording device 210 is maintained in a turn-off state (deactivated state), the vehicle video recording device 210 determines whether a predetermined time comes in step 350. Here, the predetermined time may be set with a predetermined period or set to any time.

Accordingly, it can be determined whether the supply of power is stopped due to nonuse of the vehicle, or the supply of power to the vehicle video recording device 210 is stopped for illegal purposes (for example, avoidance of the disadvantage due to the generation and storage of the accurate driving information) in spite of the use of the vehicle.

When the predetermined time does not come in, the process of step 310 is performed again. However, when the predetermined time comes in, the vehicle video recording device 210 is activated in step 360 and generates and stores the driving information in a predetermined way in step 370.

At this time, unlike the process of step 330, the vehicle video recording device 210 is driven with the power supplied from the auxiliary power supply unit, thereby minimizing the power consumption. For example, the power consumption can be minimized by the operation of storing only the minimum information (for example, the traveling distance or the GPS positional coordinates) for recognizing the driving or the position variation of the vehicle.

In step 380, the vehicle video recording device 210 verifies that the vehicle is used on the basis of the driving information generated in step 370 or the information acquired to generate the driving information, and stores the verification data and/or the verification result data in the data storage unit 235.

By this verification, it can be checked whether the driving information is normally generated depending on the use (for example, traveling) or the nonuse (for example, parking) of the vehicle.

Some examples where it is verified that the driving information is normally generated or whether the device is deactivated for the driver's illegal purposes will be described in brief However, the verification method is not limited to the below-described examples. One or more of the examples for the verification may be combined for use.

In a first example, the verification is performed by determining whether the position varies in the state where the vehicle video recording device 210 is turned off. In this example, the positioning unit of the sensing unit 245 can be used. When power is not supplied to the vehicle video recording device 210, the device is activated (turned on) periodically or at a designated time and recognizes and stores the current position. Accordingly, the verification is performed by determining whether the presently-stored position is matched with the position stored just before. When the traveling speed is sensed at the time point that the vehicle video recording device 210 is activated, an illegal deactivated state is determined and the corresponding information is stored.

In a second example, the verification is performed using a video input from the video input unit 225. That is, the video input from the video input unit 225 at the time of activating the device in step 360 is processed as a still image (or a video for a predetermined time) by the data processor 230 and is stored in the data storage unit 235, whereby the use of the vehicle can be verified depending on whether the presently-stored still image is matched with the still image stored just before within a margin of error. In this case, known video analysis techniques for comparing and analyzing plural videos can be used. Here, the margin of error can be determined, for example, by the number of pixels having different color values, a ratio or threshold of the area of an outline of an object, or the like. The storage area for storing such still images may be common to or separated from the storage area for storing the driving information. In the latter, the memory can be managed in the form of a circular queue.

In a third example, the verification is performed by sensing a variation in battery voltage of a vehicle. This example can be applied to a case where the vehicle video recording device 210 is directly supplied from the battery of the vehicle and is activated by pressing an activation button. That is, like the case where the vehicle is started up in the state where the battery voltage of the vehicle is being measured, time information and position information at the time point when the battery voltage of the vehicle rapidly varies are stored and information on whether the vehicle video recording device 210 is activated within a predetermined time range from that time point.

In a fourth example, the verification is performed on the basis of the sensed information (for example, temperature and humidity) sensed by the environment sensor unit of the sensing unit 245. That is, by using the information provided from the environment sensor unit, it can be determined afterward whether the vehicle video recording device 210 is located inside or outside the vehicle (for example, indoor) and how long this state is maintained.

In a fifth example, the verification is performed by sensing the supply state of power. When the battery of a vehicle is exchanged or a user breaks the power supply line through which power is supplied from the battery of the vehicle for illegal purposes, the vehicle video recording device 210 senses the stop of the supply of power and then stores the time information and the position information at that time in the data storage unit 235 using power supplied from the auxiliary power supply unit. Thereafter, when the supply of power is carried out normally, the time information and the position information at that time are stored, whereby the time when the devices is in the deactivated and the position shift in the deactivated state can be checked afterward. For example, when the period of time that the vehicle video recording device 210 is maintained in the deactivated state by the break of the power supply line is equal to or greater than a predetermined period of time, disadvantages such as penalty or the refusal of payment of insurance money for accidents in the period can be given.

In a six example, the verification is performed on the basis of the vehicle information provided from the vehicle information collecting unit 240. That is, it is checked whether the vehicle is started up using a speed signal and an RPM signal included in the vehicle information. When the vehicle is started up but the RPM signal is not input, a driver may be notified of a system error.

The vehicle video recording device 210 finishes its operation in step 390 and performs the process of step 310 again.

Figure 4:
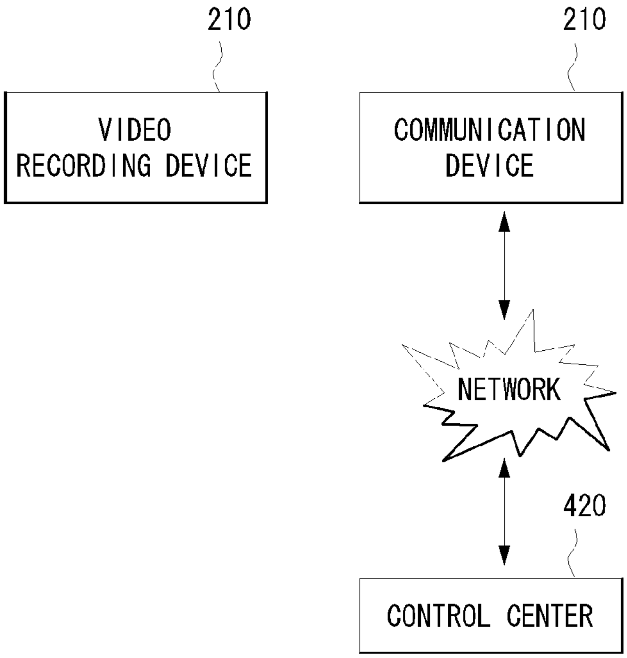
FIG. 4 is a diagram illustrating a driving information transmitting system according to an exemplary embodiment of the invention.
Figure 5:
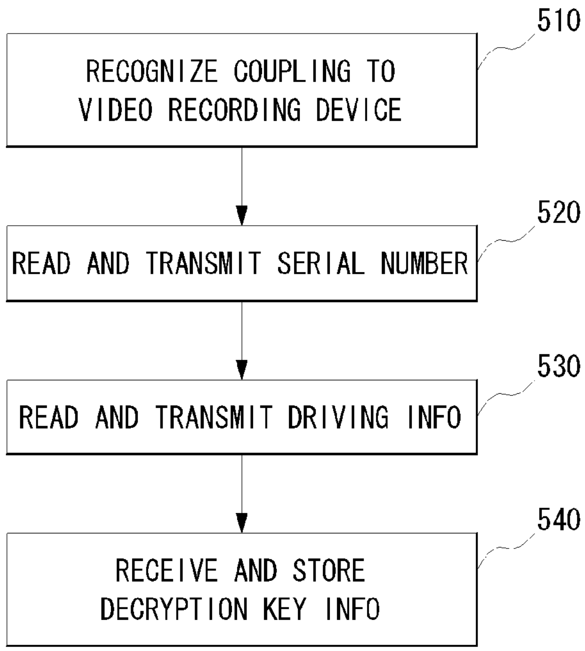
FIG. 5 is a flow diagram illustrating a driving information transmitting procedure according to an exemplary embodiment of the invention.

FIG. 4 is a system diagram illustrating a driving information transmitting system according to an exemplary embodiment of the invention. FIG. 5 is a flow diagram illustrating a driving information transmitting procedure according to an exemplary embodiment of the invention.

As described above, the vehicle video recording device 210 performs the function of generating driving information in addition to the functions of recording and storing an accident video and the like. The data file (that is, video information and the like) recorded and stored to guide the transmission of driving information to the control center 420 is encrypted and stored, and the encrypted data file is decrypted by the use of decryption key information received from the control center 420 after the transmission of the driving information.

The driving information may be transmitted to the control center 420, for example, when a management program installed in a communication device 410 recognizes that the vehicle video recording device 210 is mounted, when the device accesses the control center 420 to receive the decryption key information for reproducing the encrypted and stored data file, when a user inputs a command to transmit driving information, and when a program installed in the vehicle video recording device 210 is updated.

FIG. 4 shows an example where a single control center 420 receives the driving information and transmits the decryption key information, but the control center should be considered as a term indicating one or more units comprehensively performing the operations or partially or individually performing the operations. The units performing the operations may be different from each other.

When the vehicle video recording device 210 includes a transmission unit that can directly access a wired/wireless network so as to transmit the driving information, the vehicle video recording device 210 can transmit the stored driving information to the control center 420 and receive the decryption key information via the network.

When the vehicle video recording device 210 does not directly access the network, it can be connected to the communication device 410 (for example, one or more of a mobile communication terminal, a PDA, and a computer) via a communication cable so as to transmit the stored driving information to the control center 420 and receive the decryption key information therefrom by the use of the communication function of the communication device 410. In this case, the management program for reading and transmitting the driving information to the control center 420 may be installed in the vehicle video recording device 210 or/and the communication device 410.

When the data storage unit 235 includes a detachable nonvolatile memory card, only the nonvolatile memory card is detached and then coupled to a reader mounted on the communication device 410, and the management program installed in the communication device 410 reads and transmits the driving information stored in the nonvolatile memory card to the control center 420 and stores the received decryption key information in the nonvolatile memory card.

The driving information transmitting procedure will be described below with reference to FIG. 5. Here, it is assumed that the vehicle video recording device 210 is connected to the communication device 410 via a communication cable and the management program installed in the communication device 410 reads and transmits the driving information.

The management program recognizes the connection to the vehicle video recording device 210 via the communication cable in step 510, and reads an encrypted serial number stored in the vehicle video recording device 210 and transmits the encrypted serial number to the control center 420 via a network in step 520.

The control center 420 decrypts the encrypted serial number, determines whether the serial number is valid, and instructs the management program to transmit the driving information via the network when the serial number is valid.

The management program reads the driving information stored in the data storage unit 235 of the vehicle video recording device 210 and transmits the read driving information to the control center 420 via the network.

Thereafter, the management program receives the decryption key information for decrypting the data file encrypted and stored in the vehicle vide recording device 210 and stores the decryption key information in a storage area in the vehicle video recording device 210, whereby the encrypted and stored data file can be reproduced. The decryption key information used to guide the transmission of the driving information may be generated to decrypt and reproduce only a data file generated after the previous transmission of the driving information and before the present transmission of the driving information.

The above-mentioned driving information providing method may be carried out in time series by a software program built in a vehicle video recording device. Codes and code segments of the program will be easily obtained by programmers skilled in the art. The program can be stored in a computer-readable recording medium and can be read and executed by a computer to embody the above-mentioned methods. The recording medium includes a magnetic recording medium, an optical recording medium, and a carrier wave medium.

While the invention has been described with reference to the exemplary embodiments, it will be understood by those skilled in the art that the invention can be modified and changed in various forms without departing from the spirit and scope of the invention described in the appended claims.

What is claimed is:

1. A vehicle video recording device for recording an outside video, comprising:

a sensing unit that includes one or more of a positioning unit, an inertia sensor unit, and an environment sensor unit so as to output sensed information;

a vehicle information collecting unit that collects vehicle information from one or more of one or more sensors and a self-diagnosis device disposed in a vehicle; and a driving information generating unit that generates driving information during use and nonuse of the vehicle on a basis of one or more of the sensed information and the vehicle information, wherein different sets of the driving information are generated depending on whether the vehicle is in use or nonuse, and wherein the different sets of driving information includes:

a first set generated during use of the vehicle, the first set comprising at least one of a driving date, a traveling distance, a traveling speed, a direction indicator signal, a safety belt wearing signal, an acceleration pedal signal, a brake signal, a residual fuel signal, and ejected fuel signal; and a second set generated during nonuse of the vehicle, the second set comprising at least one of the traveling distance and GPS positional coordinates.

2. The vehicle video recording device according to claim 1, wherein the driving information is transmitted to a control center via a network.

3. The vehicle video recording device according to claim 2, further comprising a data processor that generates an encrypted data file corresponding to the outside video, wherein decryption key information for decrypting the encrypted data file is supplied from the control center after the driving information is transmitted.

4. The vehicle video recording device according to claim 1, further comprising:

an auxiliary power supply unit that supplies driving power when the driving power is not supplied from the vehicle; and a control unit that determines whether the vehicle video recording device is in a deactivated state at a predetermined time, switches the vehicle video recording device to an activated state using the auxiliary power supply unit so as to generate the driving information when the vehicle video recording device is in a deactivated state, and switches the vehicle video recording device to the deactivated state after the driving information is generated.

5. The vehicle video recording device according to claim 4, wherein the driving information generating unit further generates one or more of verification information for verifying the driving information and verification result information.

6. The vehicle video recording device according to claim 5, wherein the driving information is verified by determining whether position information included in the driving information generated after the vehicle video recording device is switched to the activated state is matched with position information included in the driving information generated and stored just before.

7. The vehicle video recording device according to claim 5, wherein the driving information is verified by determining whether video data generated when the vehicle video recording device is switched to the activated state is matched with video data stored just before within a margin of error.

8. The vehicle video recording device according to claim 5, wherein a battery voltage of the vehicle is measured in real time, and when the battery voltage varies by a threshold voltage or more within a designated time range, position information and time information at that time are stored as the verification information.

9. A driving information generating method that is performed by a vehicle video recording device recording an outside video, the comprising:

acquiring vehicle information and sensed information using a self-diagnosis device and one or more sensors; and generating driving information during use and nonuse of a vehicle on a basis of one or more of the sensed information and the vehicle information, wherein different sets of the driving information are generated depending on whether the vehicle is in use or in nonuse, and wherein the different sets of driving information includes:

a first set generated during use of the vehicle, the first set comprising at least one of a driving date, a traveling distance, a traveling speed, a direction indicator signal, a safety belt wearing signal, an acceleration pedal signal, a brake signal, a residual fuel signal, and ejected fuel signal; and a second set generated during nonuse of the vehicle, the second set comprising at least one of the traveling distance and GPS positional coordinates.

10. The driving information generating method according to claim 9, wherein the driving information is transmitted to a control center via a network.

11. The driving information generating method according to claim 9, further comprising:

generating an encrypted data file corresponding to the outside video; and receiving decryption key information for decrypting the encrypted data file after the driving information is transmitted.

12. The driving information generating method according to claim 9, further comprising:

determining whether the vehicle video recording device is in a deactivated state at a predetermined time and switching the vehicle video recording device to an activated state using an auxiliary power supply unit when it is determined that the vehicle video recording device in the deactivated state;

generating the driving information; and switching the vehicle video recording device to the deactivated state.

13. The driving information generating method according to claim 12, further comprising a step of further generating one or more of verification information for verifying the driving information and verification result information.

14. The driving information generating method according to claim 12, wherein the driving information is verified by determining whether position information included in the driving information generated after the vehicle video recording device is switched to the activated state is matched with position information included in the driving information generated and stored just before.

15. The driving information generating method according to claim 12, wherein the driving information is verified by determining whether video data generated when the vehicle video recording device is switched to the activated state is matched with video data stored just before within a margin of error.

16. The driving information generating method according to claim 13, wherein a battery voltage of the vehicle is measured in real time, and when the battery voltage varies by a threshold voltage or more within a designated time range, position information and time information at that time are stored as the verification information.

17. A non-transitory recording medium having recorded thereon a program which can be read by a digital processor and in which command words executable by a vehicle video recording device are materially described so as to carry out the driving information generating method according to claim 9.

* * * * *